(12) United States Patent
Hsiung et al.

(10) Patent No.: US 12,320,743 B2
(45) Date of Patent: Jun. 3, 2025

(54) CROSS-VALIDATION BASED CALIBRATION OF A SPECTROSCOPIC MODEL

(71) Applicant: VIAVI Solutions Inc., Chandler, AZ (US)

(72) Inventors: Chang Meng Hsiung, Redwood City, CA (US); Lan Sun, Santa Rosa, CA (US)

(73) Assignee: VIAVI Solutions, Inc., Chandler, AZ (US)

( * ) Notice: Subject to any disclaimer, the term of this patent is extended or adjusted under 35 U.S.C. 154(b) by 157 days.

(21) Appl. No.: 18/345,585

(22) Filed: Jun. 30, 2023

(65) Prior Publication Data

US 2023/0349818 A1    Nov. 2, 2023

Related U.S. Application Data

(63) Continuation of application No. 17/248,867, filed on Feb. 11, 2021, now Pat. No. 11,719,628, which is a
(Continued)

(51) Int. Cl.
*G01N 21/27* (2006.01)
*G01J 3/02* (2006.01)

(52) U.S. Cl.
CPC .......... *G01N 21/274* (2013.01); *G01J 3/0275* (2013.01); *G01N 2201/129* (2013.01)

(58) Field of Classification Search
CPC ............ G01N 21/274; G01N 2201/129; G01J 3/0275
See application file for complete search history.

(56) References Cited

U.S. PATENT DOCUMENTS 5,459,677 A    10/1995    Kowalski et al.
6,230,077 B1    5/2001    Choi
(Continued)

FOREIGN PATENT DOCUMENTS

CN    103528990 A    1/2014
CN    105117734 A    12/2015
(Continued)

OTHER PUBLICATIONS

Andries., "Penalized Eigendecompositions: Motivations from Domain Adaptation for Calibration Transfer", Journal of Chemometrics, Apr. 1, 2017, vol. 31 (4), pp. 1-14, XP055635970.
(Continued)

*Primary Examiner* — Jamil Ahmed
(74) *Attorney, Agent, or Firm* — FOLEY & LARDNER LLP

(57) ABSTRACT

A device may receive a master data set for a first spectroscopic model; receive a target data set for a target population associated with the first spectroscopic model to update the first spectroscopic model; generate a training data set that includes the master data set and first data from the target data set; generate a validation data set that includes second data from the target data set and not the master data set; generate, using cross-validation and using the training data set and the validation data set, a second spectroscopic model that is an update of the first spectroscopic model; and provide the second spectroscopic model.

20 Claims, 10 Drawing Sheets

Related U.S. Application Data continuation of application No. 16/448,914, filed on Jun. 21, 2019, now Pat. No. 10,928,309.

(60) Provisional application No. 62/692,248, filed on Jun. 29, 2018.

(56) References Cited

U.S. PATENT DOCUMENTS

| | | | |
|---|---|---|---|
| 6,341,257 | B1 | 1/2002 | Haaland |
| 7,277,810 | B2 | 10/2007 | Schumacher et al. |
| 8,010,309 | B2 | 8/2011 | Lundstedt et al. |
| 8,914,312 | B2 | 12/2014 | McLaughlin et al. |
| 9,931,039 | B2 | 4/2018 | Huang et al. |
| 10,429,240 | B2 | 10/2019 | Hsiung et al. |
| 10,928,309 | B2 | 2/2021 | Hsiung et al. |
| 2011/0045598 | A1 | 2/2011 | Busch et al. |
| 2014/0012504 | A1* | 1/2014 | Ben-Dor .......... G01N 33/24 |
| | | | 702/2 |
| 2015/0160121 | A1 | 6/2015 | Ridder et al. |
| 2016/0141193 | A1 | 5/2016 | Pandev et al. |
| 2016/0358099 | A1 | 12/2016 | Sturlaugson et al. |
| 2021/0164891 | A1 | 6/2021 | Hsiung et al. |

FOREIGN PATENT DOCUMENTS

| | | |
|---|---|---|
| CN | 105203498 A | 12/2015 |
| CN | 104089911 B | 5/2016 |
| CN | 103854305 B | 8/2016 |
| JP | 2015526135 A | 9/2015 |
| JP | 2017004509 A | 1/2017 |
| JP | 2018059900 A | 4/2018 |
| KR | 20050078924 A | 8/2005 |
| WO | 2015145120 A1 | 10/2015 |

OTHER PUBLICATIONS

Bian., "Ensemble Calibration for the Spectral Quantitative Analysis of Complex Samples," Journal of Chemometrics, Oct. 17, 2017, vol. 32, pp. 1-13.

Extended European Search Report for Application No. EP22168542. 3, mailed on Aug. 10, 2022, 10 pages.

Extended European Search Report for Application No. EP19183083. 5, mailed on Nov. 27, 2019, 12 pages.

Sulub Y., et al., "Near-infrared Multivariate Calibration Updating Using Placebo: A Content Uniformity Determination of Pharmaceutical Tablets", Vibrational Spectroscopy, Elsevier Science, Amsterdam, NL, Nov. 28, 2007, vol. 46 (2), pp. 128-134, XP022493310.

Tencate A.J., et al., "Fusion Strategies for Selecting Multiple Tuning Parameters for Multivariate Calibration and Other Penalty based Processes: A Model Updating Application for Pharmaceutical Analysis", Analytica Chimica Acta, Elsevier, Apr. 7, 2016, vol. 921, pp. 28-37, XP029523467.

* cited by examiner

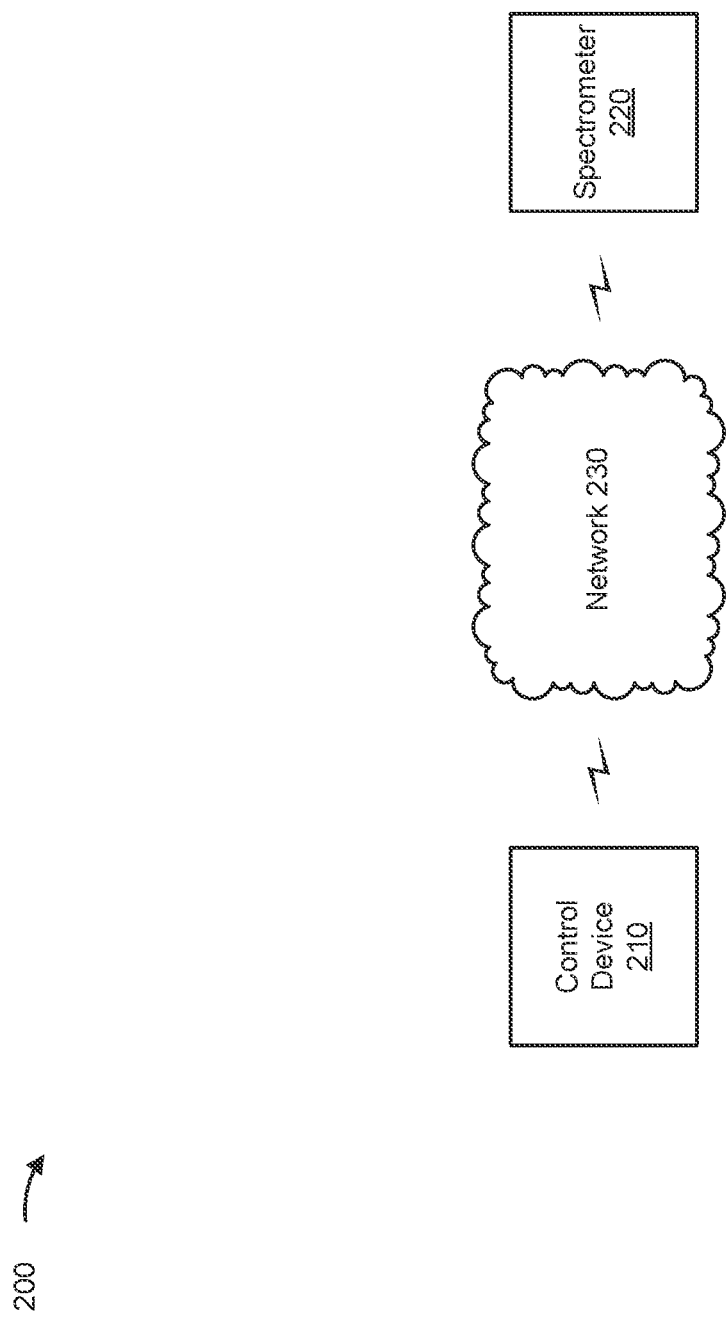

CROSS-VALIDATION BASED CALIBRATION OF A SPECTROSCOPIC MODEL

RELATED APPLICATION(S)

This application is a continuation of U.S. patent application Ser. No. 17/248,867, filed Feb. 11, 2021, which is a continuation of U.S. patent application Ser. No. 16/448,914, filed Jun. 21, 2019 (now U.S. Pat. No. 10,928,309), which claims priority under 35 U.S.C. § 119 to U.S. Provisional Patent Application No. 62/692,248, filed on Jun. 29, 2018, and entitled "UPDATING CALIBRATION MODELS BASED ON NEAR-INFRARED (NIR) SPECTRA," the contents of which are incorporated by reference herein in their entirety.

BACKGROUND

Raw material identification may be utilized for quality-control of pharmaceutical products. For example, raw material identification may be performed on a medical material to determine whether component ingredients of the medical material correspond to a packaging label associated with the medical material. Similarly, raw material quantification may be performed to determine a concentration of a particular chemical in a particular sample. Spectroscopy may facilitate non-destructive raw material identification and/or quantification with reduced preparation and data acquisition time relative to other chemometric techniques.

SUMMARY

According to some implementations, a device may include one or more memories; and one or more processors, communicatively coupled to the one or more memories, configured to: receive a master data set for a first spectroscopic model; receive a target data set for a target population associated with the first spectroscopic model to update the first spectroscopic model; generate a training data set that includes the master data set and first data from the target data set; generate a validation data set that includes second data from the target data set and not the master data set; generate, using cross-validation and using the training data set and the validation data set, a second spectroscopic model that is an update of the first spectroscopic model; and provide the second spectroscopic model.

According to some implementations, a method may include receiving, by a device, a target data set for a target population associated with a first spectroscopic model; obtaining, by the device, a master data set for the first spectroscopic model based on receiving the target data set; determining, by the device, an optimal partial least squares (PLS) factor using cross-validation, wherein the optimal PLS factor is determined based on a plurality of training data sets, each training data set including a respective portion of the target data set and all of the master data set and based on a plurality of validation data sets, each validation data set including a respective portion of the target data set and not including data of the master data set; merging, by the device, the target data set and the master data set to generate a merged data set; generating, by the device and using the merged data set and the optimal PLS factor, a second spectroscopic model, wherein the second spectroscopic model is an update of the first spectroscopic model; and providing, by the device, the second spectroscopic model to replace the first spectroscopic model.

According to some implementations, a non-transitory computer-readable medium may store one or more instructions. The one or more instructions, when executed by one or more processors of a device, may cause the one or more processors to: receive a master data set for a first spectroscopic model; receive a target data set for a target population associated with the first spectroscopic model to update the first spectroscopic model; generate a plurality of training data sets based on the master data set and the target data set; generate a plurality of validation data sets based on the target data set, wherein the plurality of validation data sets do not include data of the master data set; determine a model setting based on the plurality of training data sets and the plurality of validation data sets and using cross-validation; generate a second spectroscopic model based on the model setting, the target data set, and the master data set; and provide the second spectroscopic model.

BRIEF DESCRIPTION OF THE DRAWINGS

FIG. 2 is a diagram of an example environment in which systems and/or methods described herein may be implemented.

DETAILED DESCRIPTION

Figure 1A:
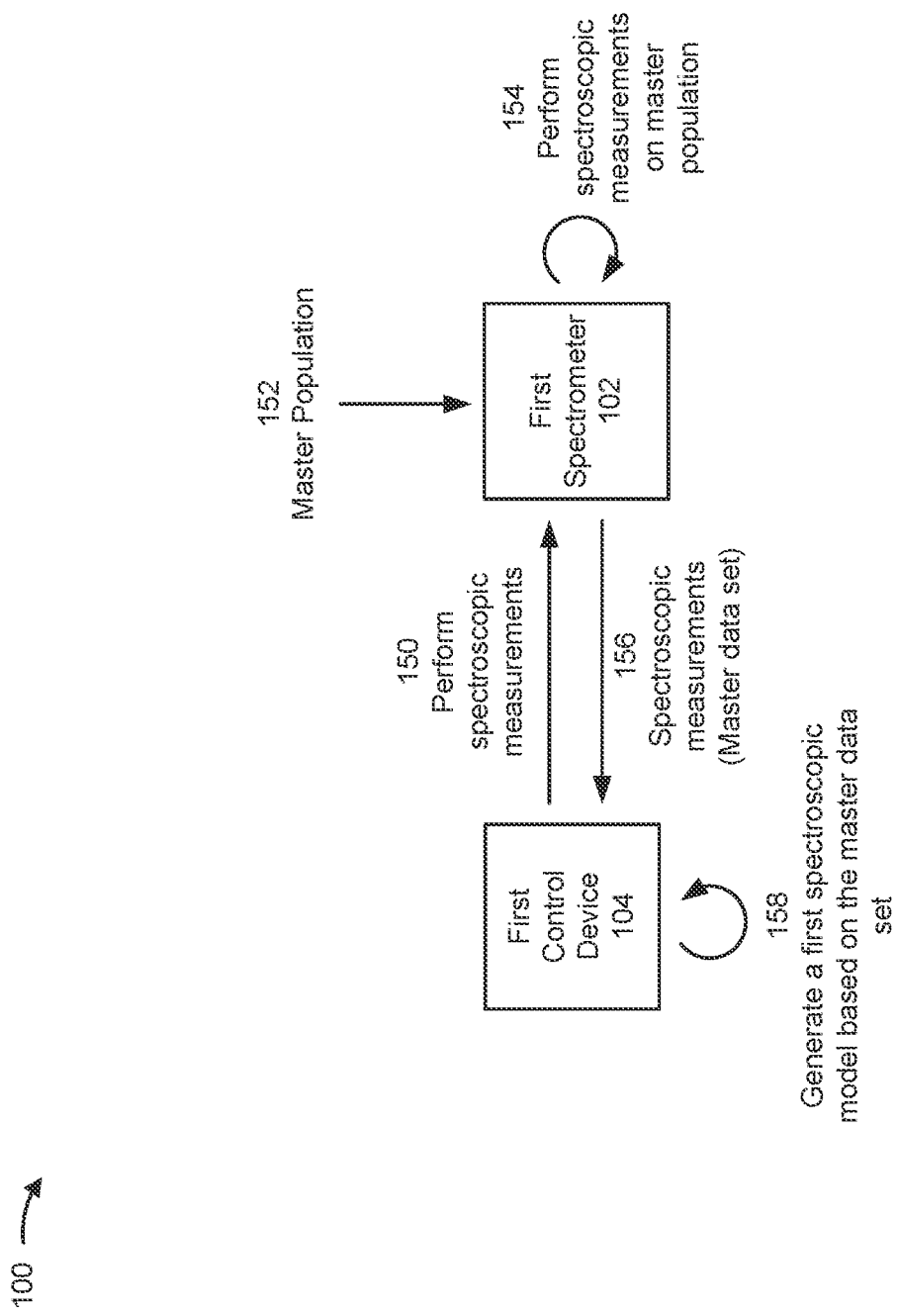
FIGS. 1A-1E are diagrams of an overview of an example implementation described herein.

The following detailed description of example implementations refers to the accompanying drawings. The same reference numbers in different drawings may identify the same or similar elements. The following description uses a spectrometer as an example, however, the calibration principles, procedures, and methods described herein may be used with any sensor, including but not limited to other optical sensors and spectral sensors.

Raw material identification (RMID) is a technique utilized to identify components (e.g., ingredients) of a particular sample for identification, verification, and/or the like. For example, RMID may be utilized to verify that ingredients in a pharmaceutical material correspond to a set of ingredients identified on a label. Similarly, raw material quantification is a technique utilized to perform a quantitative analysis on a particular sample, such as determining a concentration of a particular material in the particular sample. A spectrometer may be utilized to perform spectroscopy on a sample (e.g., the pharmaceutical material) to determine components of the sample, concentrations of components of the sample, and/or the like. The spectrometer may determine a set of measurements of the sample and may provide the set of measurements for a spectroscopic determination. A spectroscopic classification technique (e.g., a classifier) may facilitate determination of the components of the sample based on the set of measurements of the sample.

To perform spectroscopic classification or quantification, a spectroscopic model may be used to evaluate one or more measurements of an unknown sample. For example, a control device may attempt to classify the one or more measurements of the unknown sample as corresponding to a particular class of the spectroscopic model, a particular level and/or quantity associated with the spectroscopic model, and/or the like. However, over time, raw materials may change, which may result in inaccuracies in a spectroscopic model. For example, for spectroscopic classification applied to an agricultural product, different harvests associated with different years may have different spectra. As a result, a spectroscopic model trained on a master data set (e.g., an initial set of spectroscopic measurements of an initial population at an initial time) may be inaccurate when applied to a target data set (e.g., a subsequent set of spectroscopic measurements of a subsequent population at a subsequent time).

In another case, it may be impractical to train a spectroscopic model for each spectrometer using a master data set for each spectrometer. As a result, a control device may train a single spectroscopic model on a master data set, and deploy the single spectroscopic model for use with many different spectrometers. However, different spectrometers may be associated with different calibrations and/or may operate in different environment conditions. As a result, a spectroscopic model trained using a master data set of spectroscopic measurements performed by a first spectrometer may be inaccurate when applied to a target data set of spectroscopic measurements performed by a second spectrometer.

Some implementations described herein enable calibration updating and calibration transfer for a spectroscopic model using a cross-validation technique. For example, data from a target data set may be merged with data from a master data set to enable generation of a new spectroscopic model. In this case, data from the master data set is used for a training set for training a spectroscopic model, and data from the target data set is used for both the training set and a validation set for validating the spectroscopic model. In this way, an accuracy of the spectroscopic model is improved relative to other techniques for model generation and/or model updating. Moreover, based on improving an accuracy of transferred spectroscopic models, a necessity of obtaining a master data set for each spectrometer is reduced, thereby reducing a cost associated with deploying spectrometers.

FIGS. 1A-1E are diagrams of an example implementation 100 described herein. As shown in FIG. 1A, example implementation 100 includes a first spectrometer 102 and a first control device 104.

As further shown in FIG. 1A, and by reference number 150, first control device 104 may transmit an instruction to first spectrometer 102 to cause first spectrometer 102 to perform a set of spectroscopic measurements on a master population 152. For example, first control device 104 may cause first spectrometer 102 to perform measurements on samples for each class that is to be classified using a classification model, for each quantity that is to be quantified using a quantification model, and/or the like. A class of a classification model may refer to a grouping of similar materials that share one or more characteristics in common, such as (in a pharmaceutical context) lactose materials, fructose materials, acetaminophen materials, ibuprofen materials, aspirin materials, and/or the like. Materials used to train the classification model, and for which raw material identification is to be performed using the classification model, may be termed materials of interest.

As further shown in FIG. 1A, and by reference numbers 154 and 156, first spectrometer 102 may perform the set of spectroscopic measurements and may provide the set of spectroscopic measurements to first control device 104 for processing. For example, first spectrometer 102 may determine a spectrum for each sample of master population 152 to enable first control device 104 to generate a set of classes for classifying an unknown sample as one of the materials of interest for a quantification model or as having a particular quantity in relation to a quantification model.

As further shown in FIG. 1A, and by reference number 158, first control device 104 may generate a first spectroscopic model based on the master data set. For example, first control device 104 may generate the first spectroscopic model using a particular determination technique and based on the set of spectroscopic measurements. In some implementations, first control device 104 may generate a quantification model using a support vector machine (SVM) technique (e.g., a machine learning technique for information determination). Additionally, or alternatively, first control device 104 may generate the quantification model using another type of quantification technique.

The quantification model may include information associated with assigning a particular spectrum to a particular class of quantity of a material of interest. In some implementations, the quantification model may include information associated with identifying a type of material of interest that is associated with the particular class of quantity. In this way, first control device 104 can provide information identifying a quantity of material of an unknown sample as an output of spectroscopy based on assigning a spectrum of the unknown sample to a particular class of quantity of the quantification model.

Figure 1B:
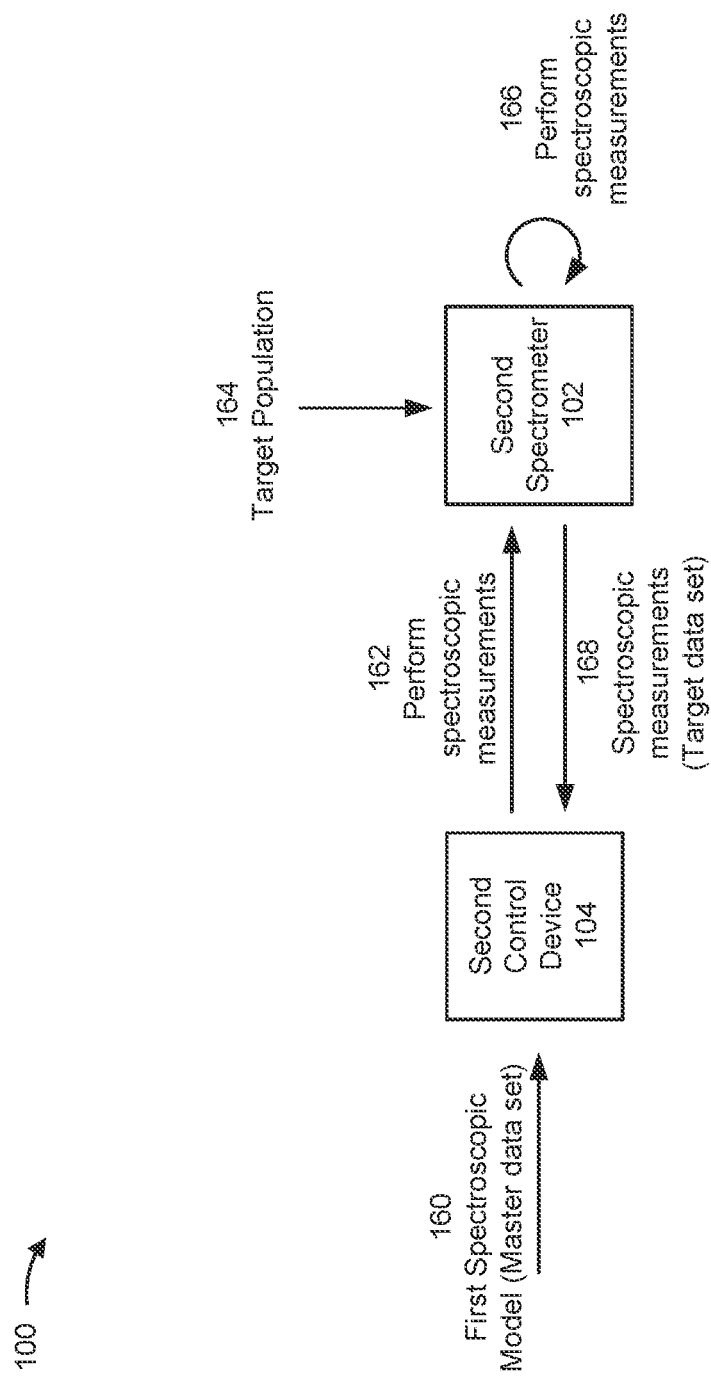

As shown in FIG. 1B, and by reference number 160, a second control device 104 may receive information associated with the first spectroscopic model. For example, second control device 104 may receive the first spectroscopic model, the master data set, and/or the like. In some implementations, second control device 104 may be associated with a different spectrometer than first control device 104. For example, in a calibration transfer case, second control device 104 may be used in connection with second spectrometer 102 (e.g., a target spectrometer), and may receive the information associated with the first spectroscopic model to enable calibration transfer from first spectrometer 102 (e.g., a master spectrometer) to second spectrometer 102. In this case, second control device 104 and second spectrometer 102 may perform measurements of a target population and generate a second spectroscopic model, as described in more detail herein. Alternatively, in a calibration update case, rather than transferring the first spectroscopic model to second control device 104, first control device 104 and first spectrometer 102 may perform the measurements of the target population and generate the second spectroscopic model, as described in more detail herein.

As further shown in FIG. 1B, and by reference number 162, second control device 104 may transmit an instruction to second spectrometer 102 to cause second spectrometer 102 to perform a set of spectroscopic measurements of target population 164. For example, second control device 104 may cause second spectrometer 102 to perform spectroscopic measurements of target population 164 based on receiving the first spectroscopic model. In some implementations, second control device 104 may determine to update or calibrate the first spectroscopic model, and may trigger second spectrometer 102 to perform the set of spectroscopic measurements. In this case, second control device 104 may communicate with first control device 104 to obtain information identifying the master data set in order to enable generation of a second spectroscopic model.

In some implementations, target population 164 may correspond to master population 152. For example, target population 164 may be additional samples of a same class as is included in master population 152. In this case, target population 164 may differ from master population 152 with respect to a time, a location, an environmental condition, and/or the like at which a sample was collected or measured. Additionally, or alternatively, target population 164 may differ from master population 152 based on being measured using a different spectrometer (e.g., being measured by second spectrometer 102 rather than by first spectrometer 102 as for master population 152).

As further shown in FIG. 1B, and by reference numbers 166 and 168, second spectrometer 102 may perform a set of spectroscopic measurements and may provide information identifying the set of spectroscopic measurements to second control device 104. For example, second spectrometer 102 may perform spectroscopic measurements of target population 164 and may provide information identifying the spectroscopic measurements (e.g., as a target data set) to second control device 104 for processing.

Figure 1C:
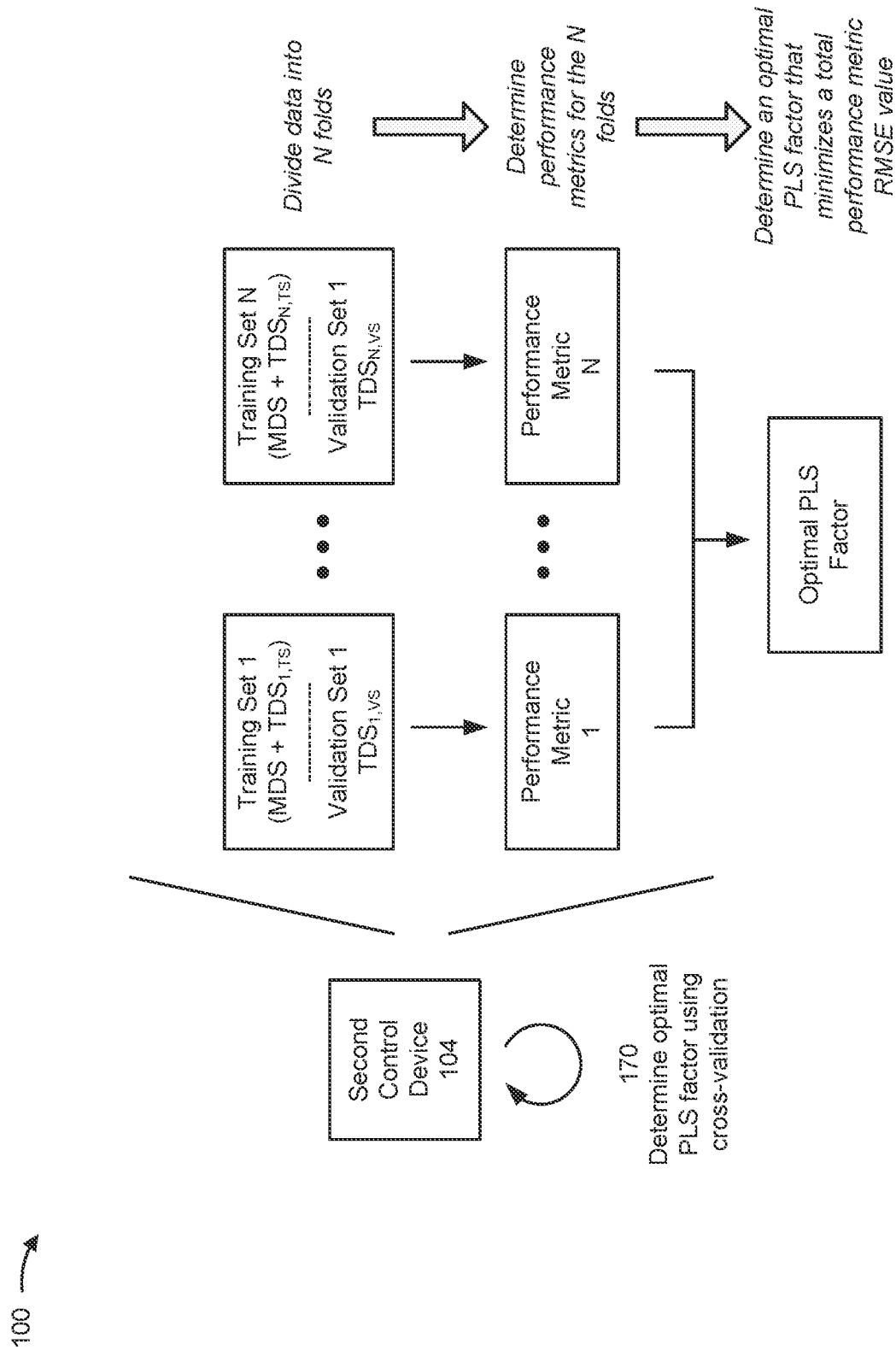

As shown in FIG. 1C, and by reference number 170, second control device 104 may determine a total performance metric. For example, second control device 104 may determine a total performance metric based on dividing data into multiple folds, determining multiple performance metrics for the multiple folds, aggregating the multiple performance metrics to determine a root mean square error (RMSE) value, and optimizing a partial least squares (PLS) factor (which may be termed an optimal PLS factor) to minimize the RMSE value. A fold may refer to a sub-group of data for cross-validation that includes a training set to generate a candidate model and a validation set to evaluate an accuracy of the candidate model in predicting data. In another example, second control device 104 may determine another type of optimized model setting, such as a model setting relating to a principal component regression (PCR) factor, a support vector regression (SVR) factor, and/or the like. In some implementations, second control device 104 may perform pre-processing optimization. For example, second control device 104 may determine optimized pre-processing parameters as a part of the model setting.

In some implementations, second control device 104 may assign data to a training set or a validation set for each fold. For example, second control device 104 may determine multiple training sets 1 through N for the N folds and multiple corresponding validation sets 1 through N for the N folds. In some implementations, a training set may include merged data that is generated by merging the master data set and the target data set. For example, a training set (e.g., training set 1) may include all data from the master data set (e.g., MDS) and a portion of data from the target data set (e.g., $TDS_{1,TS}$). In this case, a corresponding validation set may include a corresponding portion of data from the target data set (e.g., $TDS_{1,VS}$) and not data from the master data set. The corresponding validation set may omit data derived from replicate scans of a same physical sample as is included in the training set.

Based on assigning data to the multiple folds, second control device 104 may determine a performance metric for each fold. For example, second control device 104 may deter and may aggregate the performance metrics for each fold to determine the total performance metric. For example, second control device 104 may determine a PLS factor for each fold, and may determine an RMSE value for each PLS factor for each fold. Based on determining the RMSE values for each PLS factor for each fold, second control device 104 may determine a total RMSE value. For example, second control device 104 may determine an RMSE value as a function of all PLS factors of all folds. In this case, based on determining the total RMSE value, second control device 104 may determine an optimal PLS factor, which may be a PLS factor with a lowest RMSE value.

In this case, based on including the master data set and the target data set in the N-folds training sets during cross validation, but only including target data set in the corresponding validation sets, an accuracy of the second spectroscopic model is increased relative to other techniques. For example, such a technique may result in improved accuracy relative to using the first spectroscopic model without updating, relative to using only the target data set to determine the PLS performance metrics, relative to merging all of the target data set data and all of the master data set data to generate a merged data set and using divisions of the merged data set in both the training set and the validation set, and/or the like.

Figure 1D:
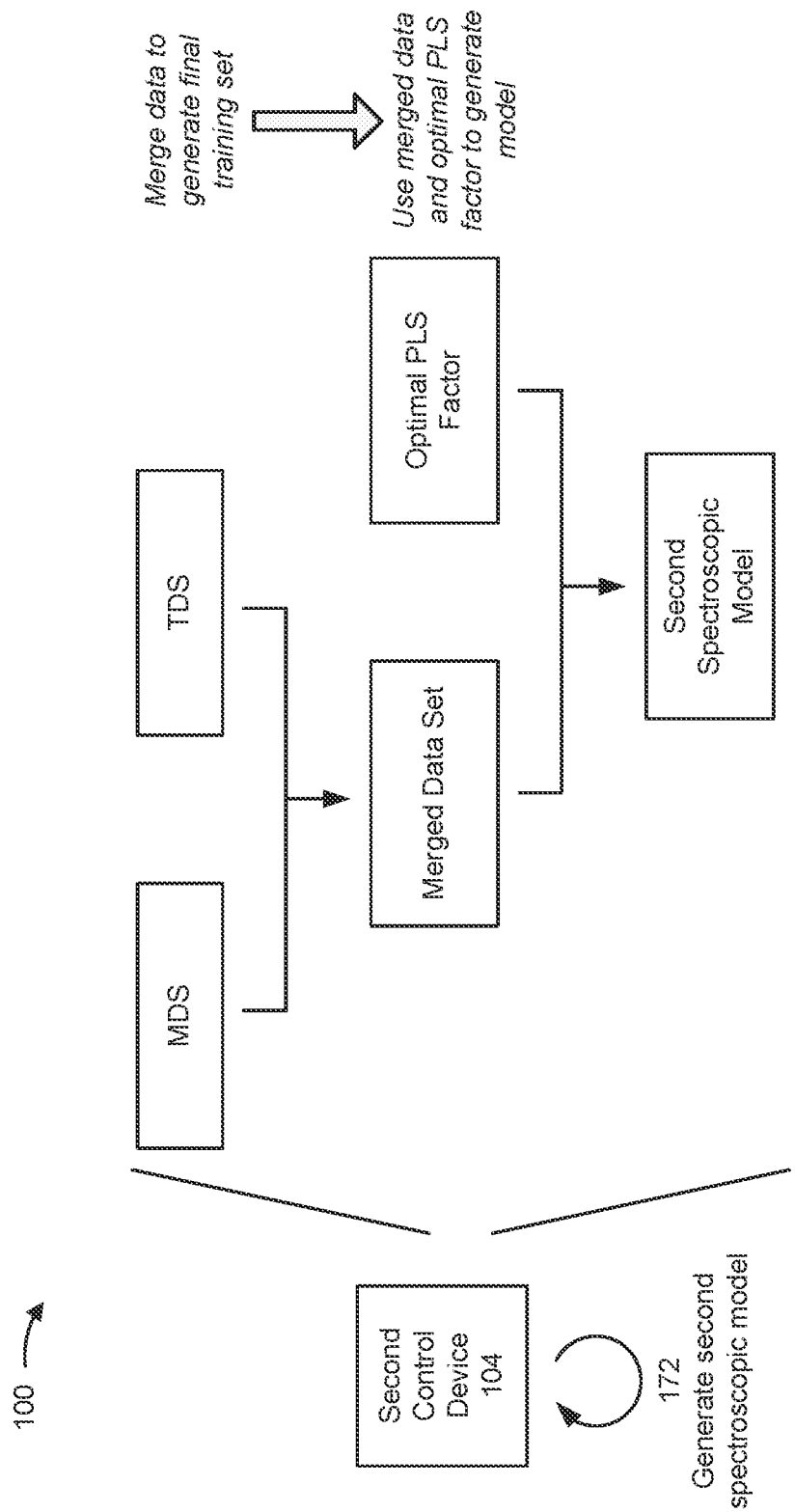

As shown in FIG. 1D, and by reference number 172, second control device 104 may generate a second spectroscopic model. For example, second control device 104 may generate the second spectroscopic model using the master data set (MDS), the target data set (TDS), and the optimal PLS factor. In this way, second control device 104 may enable generation of a calibrated spectroscopic model, an updated spectroscopic model, a transferred spectroscopic model, and/or the like.

In some implementations, second control device 104 may merge the master data set and the target data set to generate a merged data set (e.g., a final training set for training the second spectroscopic model). For example, second control device 104 may aggregate the master data set and the target data set to generate the merged data set. Based on generating the merged data set, second control device 104 may generate the second spectroscopic model using the merged data set and the optimal PLS factor (e.g., with a lowest RMSE value). For example, second control device 104, may use a quantification model generation technique to generate the second spectroscopic model in connection with the merged data set (e.g., which may be a training set for the second spectroscopic model) and the optimal PLS factor. In this way, by determining the optimal PLS factor without using the merged data set and then combining the optimal PLS factor with the merged data set, second control device 104 achieves a more accurate spectroscopic model than other techniques.

In some implementations, second control device 104 may provide the second spectroscopic model based on generating the second spectroscopic model. For example, second control device 104 may provide the second spectroscopic model for storage via a data structure, for deployment on one or more other spectrometers, and/or the like. Additionally, or alternatively, second control device 104 may provide output relating to the second spectroscopic model based on generating the second spectroscopic model. For example, second control device 104 may provide information quantifying an unknown sample based on using the second spectroscopic model to analyze the unknown sample, as described in more detail herein.

Figure 1E:
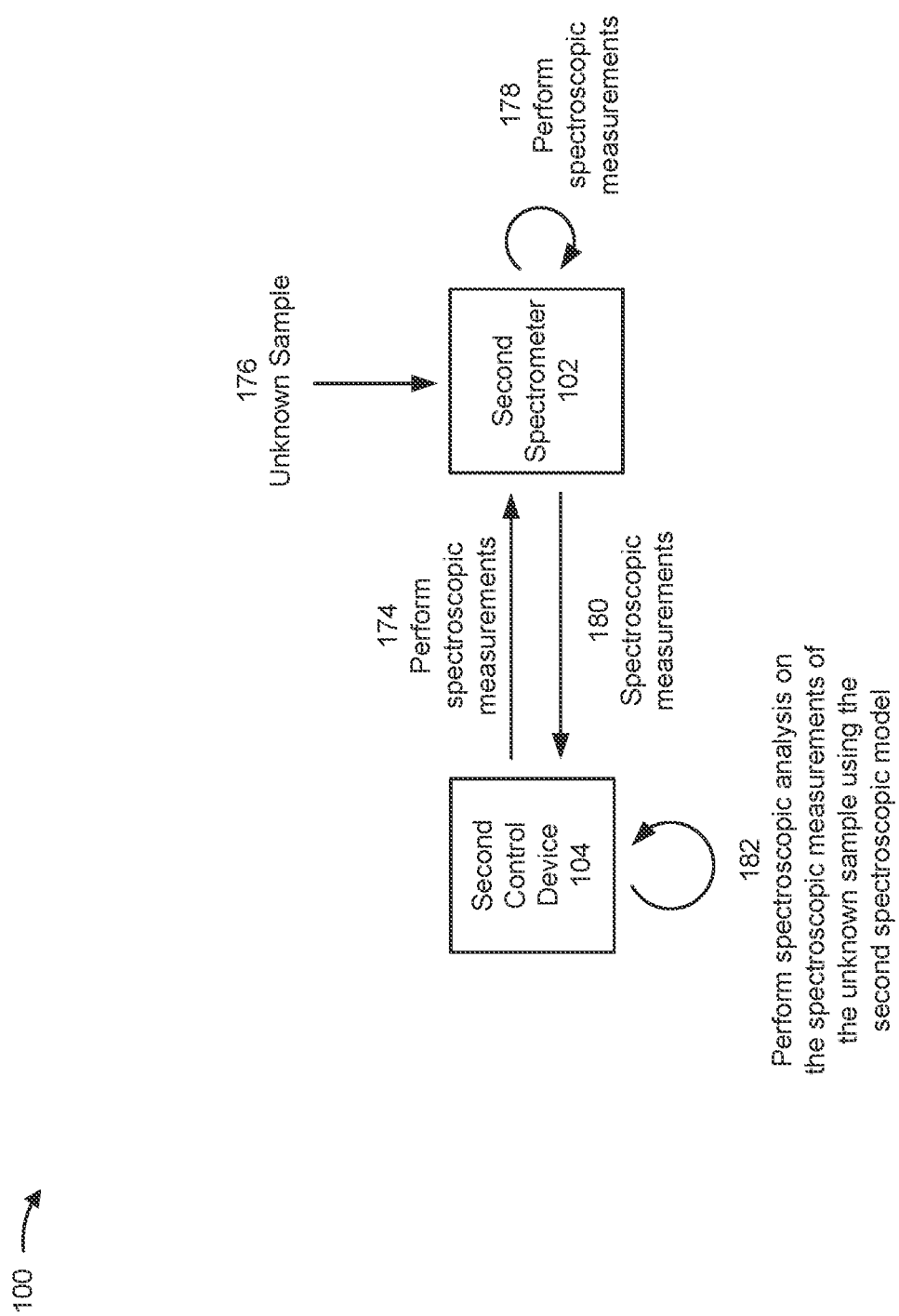

As shown in FIG. 1E, and by reference number 174, second control device 104 may transmit an instruction to second spectrometer 102 to cause second spectrometer 102 to perform a set of spectroscopic measurements on an unknown sample 176. For example, second control device 104 may cause second spectrometer 102 to perform spectroscopic measurements on unknown sample 176 after having generated the second spectroscopic model.

As further shown in FIG. 1E, and by reference numbers 178 and 180, second spectrometer 102 may perform the set of spectroscopic measurements and may provide information identifying the set of spectroscopic measurements to second control device 104. For example, second spectrometer 102 may determine a spectrum of unknown sample 176 and may provide information identifying the spectrum to second control device 104 for classification and/or quantification.

As further shown in FIG. 1E, and by reference number 182, second control device 104 may perform a spectroscopic analysis of the set of spectroscopic measurements using the second spectroscopic model. For example, second control device 104 may use the second spectroscopic model to determine a classification of unknown sample 176 and/or a quantification of unknown sample 176. In this case, second control device 104 may provide output identifying the classification and/or the quantification. In this way, second control device 104 uses the second spectroscopic model based on generating the second spectroscopic model.

As indicated above, FIGS. 1A-1E are provided merely as one or more examples. Other examples may differ from what is described with regard to FIGS. 1A-1E.

FIG. 2 is a diagram of an example environment 200 in which systems and/or methods described herein may be implemented. As shown in FIG. 2, environment 200 may include a control device 210, a spectrometer 220, a network 230, and/or the like. Devices of environment 200 may interconnect via wired connections, wireless connections, or a combination of wired and wireless connections.

Control device 210 includes one or more devices capable of storing, processing, and/or routing information associated with spectroscopic classification. For example, control device 210 may include a server, a computer, a wearable device, a cloud computing device, and/or the like that generates a spectroscopic model (e.g., a classification model or a quantification model) based on a set of measurements of a training set, validates the spectroscopic model based on a set of measurements of a validation set, and/or utilizes the spectroscopic model to perform spectroscopic analysis based on a set of measurements of an unknown sample. In some implementations, control device 210 may be associated with a particular spectrometer 220. In some implementations, control device 210 may be associated with multiple spectrometers 220. In some implementations, control device 210 may receive information from and/or transmit information to another device in environment 200, such as spectrometer 220.

Spectrometer 220 includes one or more devices capable of performing a spectroscopic measurement on a sample. For example, spectrometer 220 may include a spectroscopic device that performs spectroscopy (e.g., vibrational spectroscopy, such as near infrared (NIR) spectroscopy, mid-infrared spectroscopy (mid-IR), Raman spectroscopy, and/or the like). In some implementations, spectrometer 220 may be incorporated into a wearable device, such as a wearable spectrometer and/or the like. In some implementations, spectrometer 220 may receive information from and/or transmit information to another device in environment 200, such as control device 210.

Network 230 includes one or more wired and/or wireless networks. For example, network 230 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
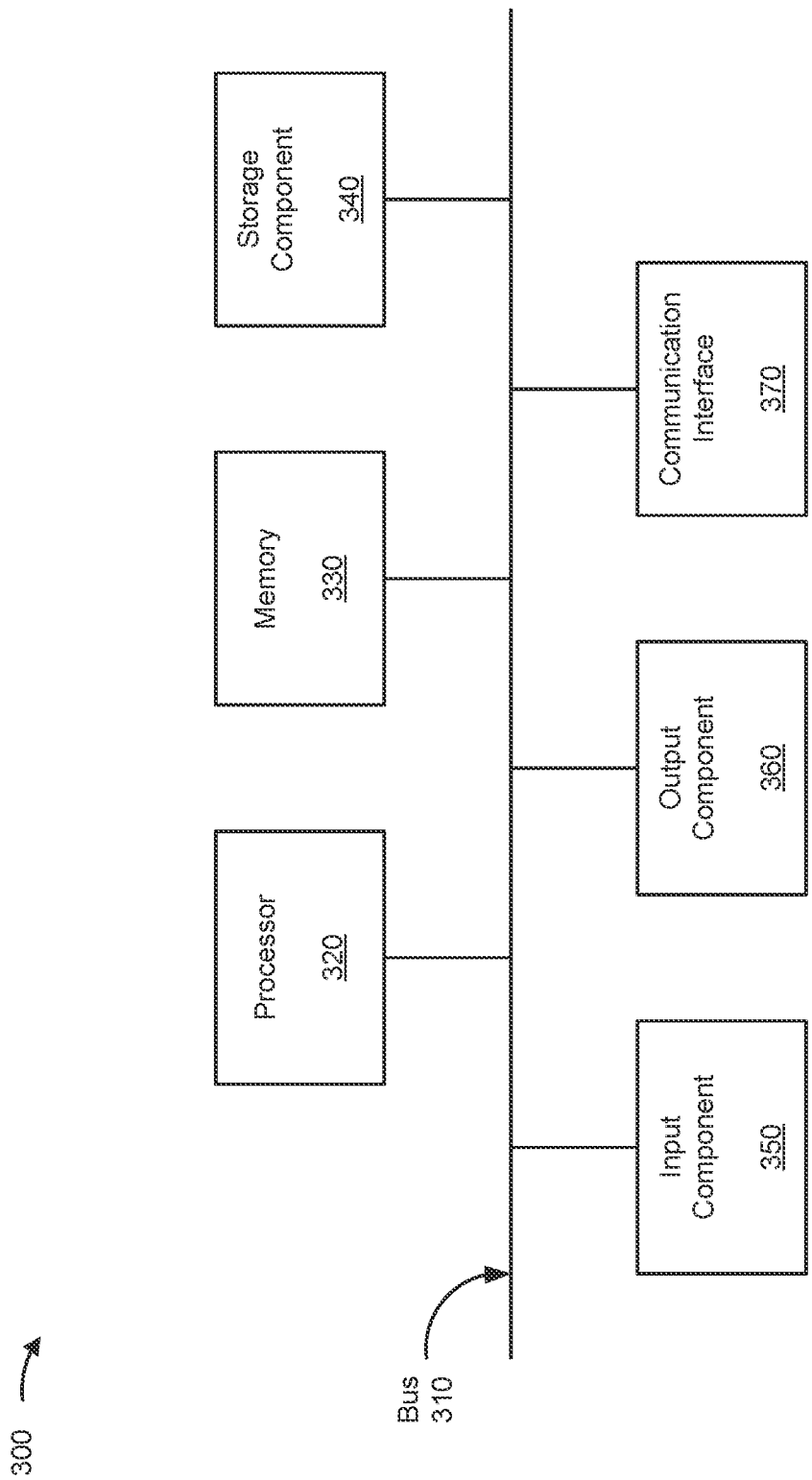
FIG. 3 is a diagram of example components of one or more devices of FIG. 2.

FIG. 3 is a diagram of example components of a device 300. Device 300 may correspond to control device 210 and/or spectrometer 220. In some implementations, control device 210 and/or spectrometer 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
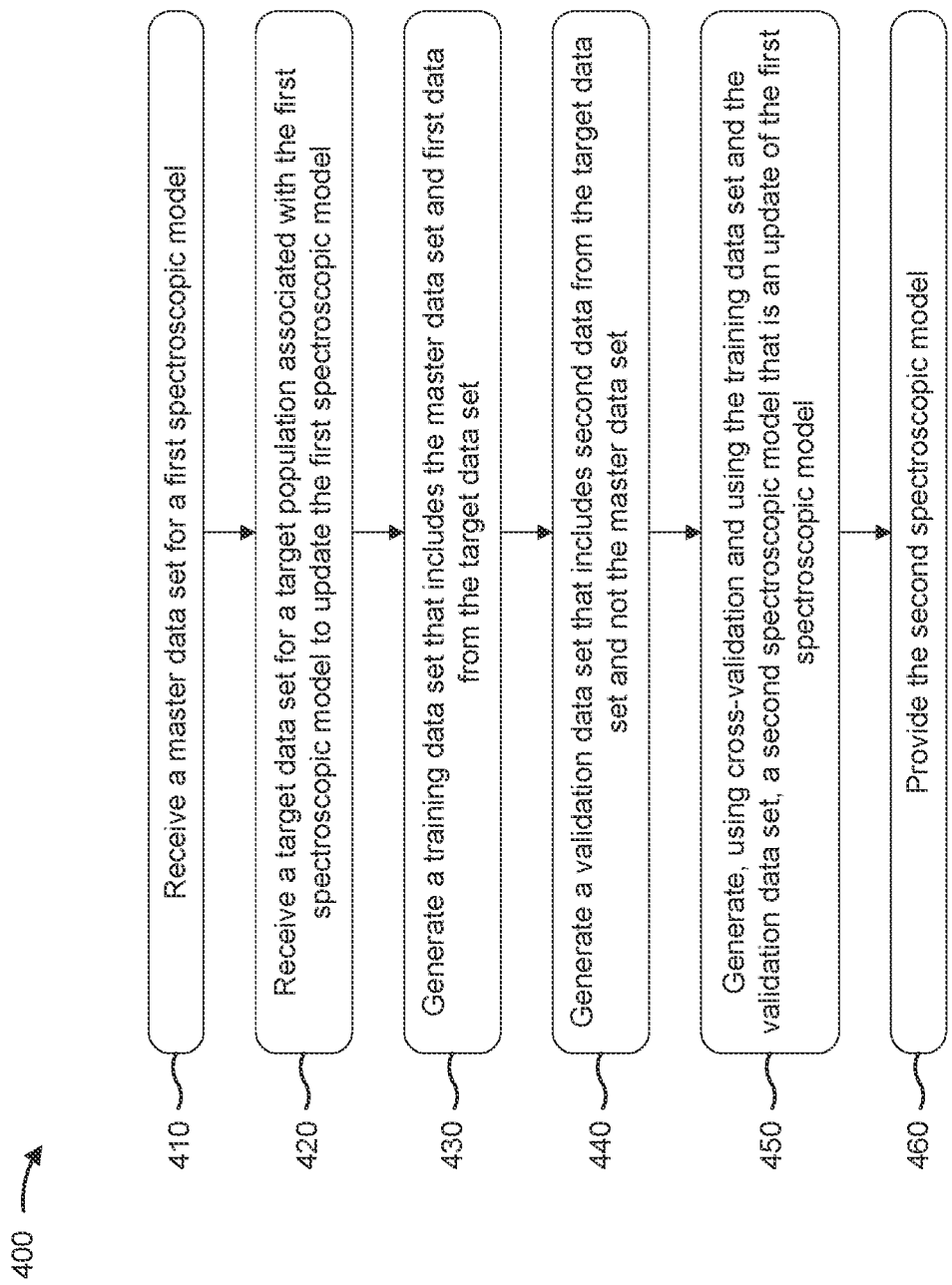
FIGS. 4-6 are flowcharts of example processes for cross-validation based calibration of a spectroscopic model.

FIG. 4 is a flow chart of an example process 400 for cross-validation based calibration of a spectroscopic model. In some implementations, one or more process blocks of FIG. 4 may be performed by control device (e.g., control device 210). In some implementations, one or more process blocks of FIG. 4 may be performed by another device or a group of devices separate from or including the control device, such as a spectrometer (e.g., spectrometer 220) and/or the like.

As shown in FIG. 4, process 400 may include receiving a master data set for a first spectroscopic model (block 410). For example, the control device (e.g., using processor 320, memory 330, storage component 340, input component 350, output component 360, communication interface 370 and/or the like) may receive a master data set for a first spectroscopic model, as described above.

As further shown in FIG. 4, process 400 may include receiving a target data set for a target population associated with the first spectroscopic model to update the first spectroscopic model (block 420). For example, the control device (e.g., using processor 320, memory 330, storage component 340, input component 350, output component 360, communication interface 370 and/or the like) may receive a target data set for a target population associated with the first spectroscopic model to update the first spectroscopic model, as described above.

As further shown in FIG. 4, process 400 may include generating a training data set that includes the master data set and first data from the target data set (block 430). For example, the control device (e.g., using processor 320, memory 330, storage component 340, input component 350, output component 360, communication interface 370 and/or the like) may generate a training data set that includes the master data set and first data from the target data set, as described above.

As further shown in FIG. 4, process 400 may include generating a validation data set that includes second data from the target data set and not the master data set (block 440). For example, the control device (e.g., using processor 320, memory 330, storage component 340, input component 350, output component 360, communication interface 370 and/or the like) may generate a validation data set that includes second data from the target data set and not the master data set, as described above.

As further shown in FIG. 4, process 400 may include generating, using cross-validation and using the training data set and the validation data set, a second spectroscopic model that is an update of the first spectroscopic model (block 450). For example, the control device (e.g., using processor 320, memory 330, storage component 340, input component 350, output component 360, communication interface 370 and/or the like) may generate, using cross-validation and using the training data set and the validation data set, a second spectroscopic model that is an update of the first spectroscopic model, as described above.

As further shown in FIG. 4, process 400 may include providing the second spectroscopic model (block 460). For example, the control device (e.g., using processor 320, memory 330, storage component 340, input component 350, output component 360, communication interface 370 and/or the like) may provide the second spectroscopic model, as described above.

Process 400 may include additional implementations, such as any single implementation or any combination of implementations described below and/or in connection with one or more other processes described elsewhere herein.

In a first implementation, process 400 includes receiving a spectroscopic measurement; performing a spectroscopic determination using the second spectroscopic model; and providing an output identifying the spectroscopic determination.

In a second implementation, alone or in combination with the first implementation, the training data set is a plurality of training data sets and the validation data set is a plurality of validation data sets, and process 400 includes generating a plurality of performance metrics based on the plurality of training data sets and the plurality of validation data sets, determining a total performance metric based on the plurality of performance metrics, determining an optimal partial least squares (PLS) factor based on the total performance metric, and determining the second spectroscopic model based on the optimal PLS factor and a merged data set, where the merged data set includes the master data set and the target data set.

In a third implementation, alone or in combination with one or more of the first and second implementations, the first spectroscopic model and the second spectroscopic model are quantification models.

In a fourth implementation, alone or in combination with one or more of the first through third implementations, the master data set is based on a first set of spectroscopic measurements performed by a master spectrometer and the target data set is based on a second set of spectroscopic measurements performed by a target spectrometer that is different from the master spectrometer.

In a fifth implementation, alone or in combination with one or more of the first through fourth implementations, the master data set is based on a first set of spectroscopic measurements performed by a particular spectrometer and the target data set is based on a second set of spectroscopic measurements performed by the particular spectrometer.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
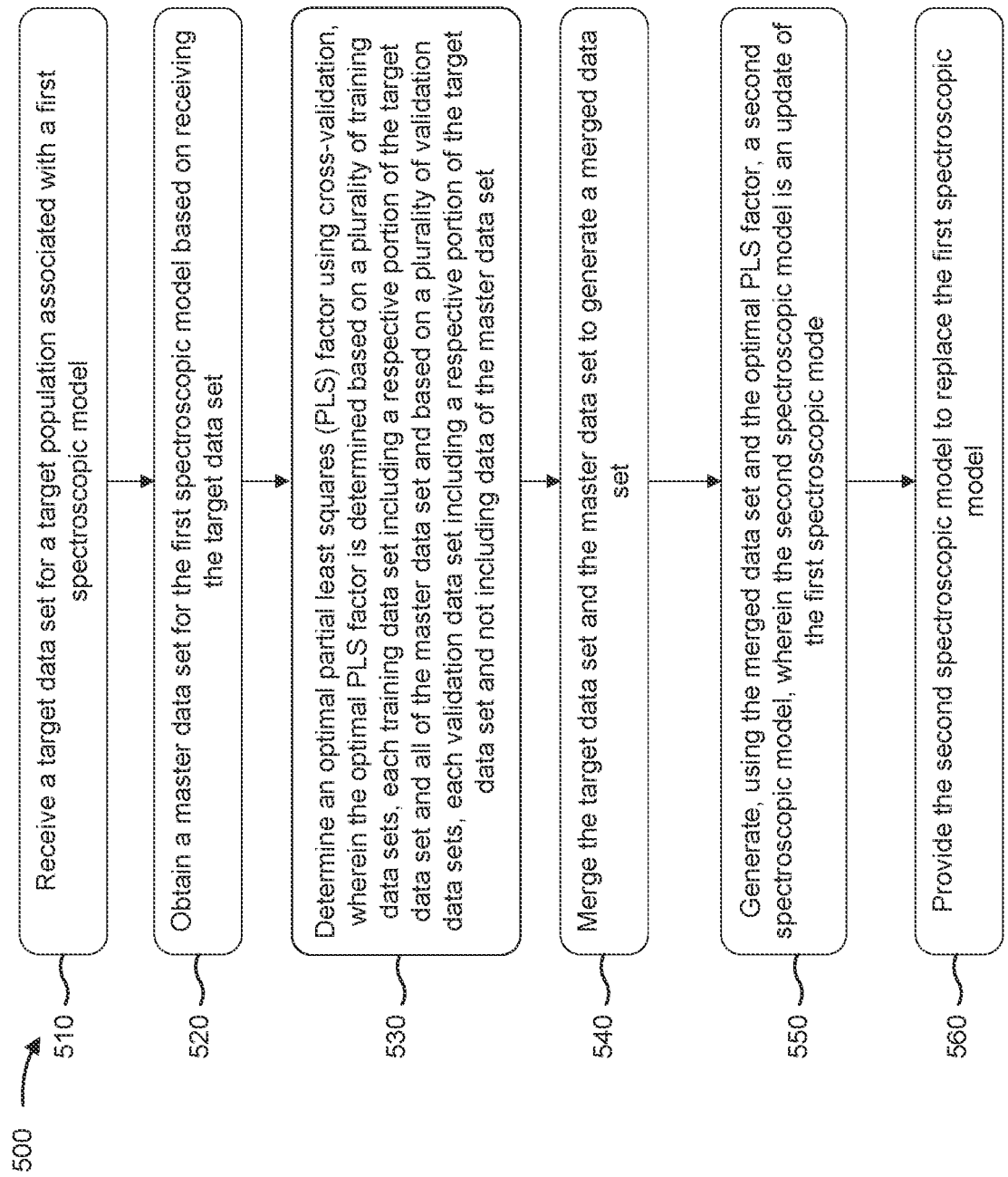

FIG. 5 is a flow chart of an example process 500 for cross-validation based calibration of a spectroscopic model. In some implementations, one or more process blocks of FIG. 5 may be performed by control device (e.g., control device 210). In some implementations, one or more process blocks of FIG. 5 may be performed by another device or a group of devices separate from or including the control device, such as a spectrometer (e.g., spectrometer 220) and/or the like.

As shown in FIG. 5, process 500 may include receiving a target data set for a target population associated with a first spectroscopic model (block 510). For example, the control device (e.g., using processor 320, memory 330, storage component 340, input component 350, output component 360, communication interface 370 and/or the like) may receive a target data set for a target population associated with a first spectroscopic model, as described above.

As further shown in FIG. 5, process 500 may include obtaining a master data set for the first spectroscopic model based on receiving the target data set (block 520). For example, the control device (e.g., using processor 320, memory 330, storage component 340, input component 350, output component 360, communication interface 370 and/or the like) may obtain a master data set for the first spectroscopic model based on receiving the target data set, as described above.

As further shown in FIG. 5, process 500 may include determining an optimal partial least squares (PLS) factor using cross-validation wherein the optimal PLS factor is determined based on a plurality of training data sets, each training data set including a respective portion of the target data set and all of the master data set and based on a plurality of validation data sets, each validation data set including a respective portion of the target data set and not including data of the master data set (block 530). For example, the control device (e.g., using processor 320, memory 330, storage component 340, input component 350, output component 360, communication interface 370 and/or the like) may determine an optimal partial least squares (PLS) factor using cross-validation, as described above. In some aspects, the optimal PLS factor is determined based on a plurality of training data sets, each training data set including a respective portion of the target data set and all of the master data set and based on a plurality of validation data sets, each validation data set including a respective portion of the target data set and not including data of the master data set.

As further shown in FIG. 5, process 500 may include merging the target data set and the master data set to generate a merged data set (block 540). For example, the control device (e.g., using processor 320, memory 330, storage component 340, input component 350, output component 360, communication interface 370 and/or the like) may merge the target data set and the master data set to generate a merged data set, as described above.

As further shown in FIG. 5, process 500 may include generating, using the merged data set and the optimal PLS factor, a second spectroscopic model wherein the second spectroscopic model is an update of the first spectroscopic model (block 550). For example, the control device (e.g., using processor 320, memory 330, storage component 340, input component 350, output component 360, communication interface 370 and/or the like) may generate, using the merged data set and the optimal PLS factor, a second spectroscopic model, as described above. In some aspects, the second spectroscopic model is an update of the first spectroscopic model.

As further shown in FIG. 5, process 500 may include providing the second spectroscopic model to replace the first spectroscopic model (block 560). For example, the control device (e.g., using processor 320, memory 330, storage component 340, input component 350, output component 360, communication interface 370 and/or the like) may provide the second spectroscopic model to replace the first spectroscopic model, as described above.

Process 500 may include additional implementations, such as any single implementation or any combination of implementations described below and/or in connection with one or more other processes described elsewhere herein.

In a first implementation, determining the optimal PLS factor includes determining partial least squares (PLS) performance metrics for each of the plurality of training data sets and each of the plurality of validation data sets; determining a total PLS performance metric based on the PLS performance metrics; and optimizing the PLS factor for the second spectroscopic model based on the total PLS performance metric.

In a second implementation, alone or in combination with the first implementation, the total PLS performance metric is associated with a root mean square error (RMSE) value, and optimizing the PLS factor includes optimizing the PLS factor to minimize the RMSE value.

In a third implementation, alone or in combination with one or more of the first and second implementations, the plurality of validation data sets includes different data of the target data set than the plurality of training data sets.

In a fourth implementation, alone or in combination with one or more of the first through third implementations, the determining the total PLS performance metric includes aggregating the PLS performance metrics.

In a fifth implementation, alone or in combination with one or more of the first through fourth implementations, the target data set is associated with a set of measurements of the target population performed after measurements associated with the master data set.

In a sixth implementation, alone or in combination with one or more of the first through fifth implementations, the second spectroscopic model is a calibration update model of the first spectroscopic model.

In a seventh implementation, alone or in combination with one or more of the first through sixth implementations, the target data set is associated with a set of measurements performed by a particular spectrometer that is different from one or more spectrometers that performed measurements associated with the master data set.

In an eighth implementation, alone or in combination with one or more of the first through seventh implementations, the second spectroscopic model is a calibration transfer model of the first spectroscopic model.

In a ninth implementation, alone or in combination with one or more of the first through eighth implementations, providing the second spectroscopic model includes providing the second spectroscopic model for use in connection with subsequent measurements by the particular spectrometer.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
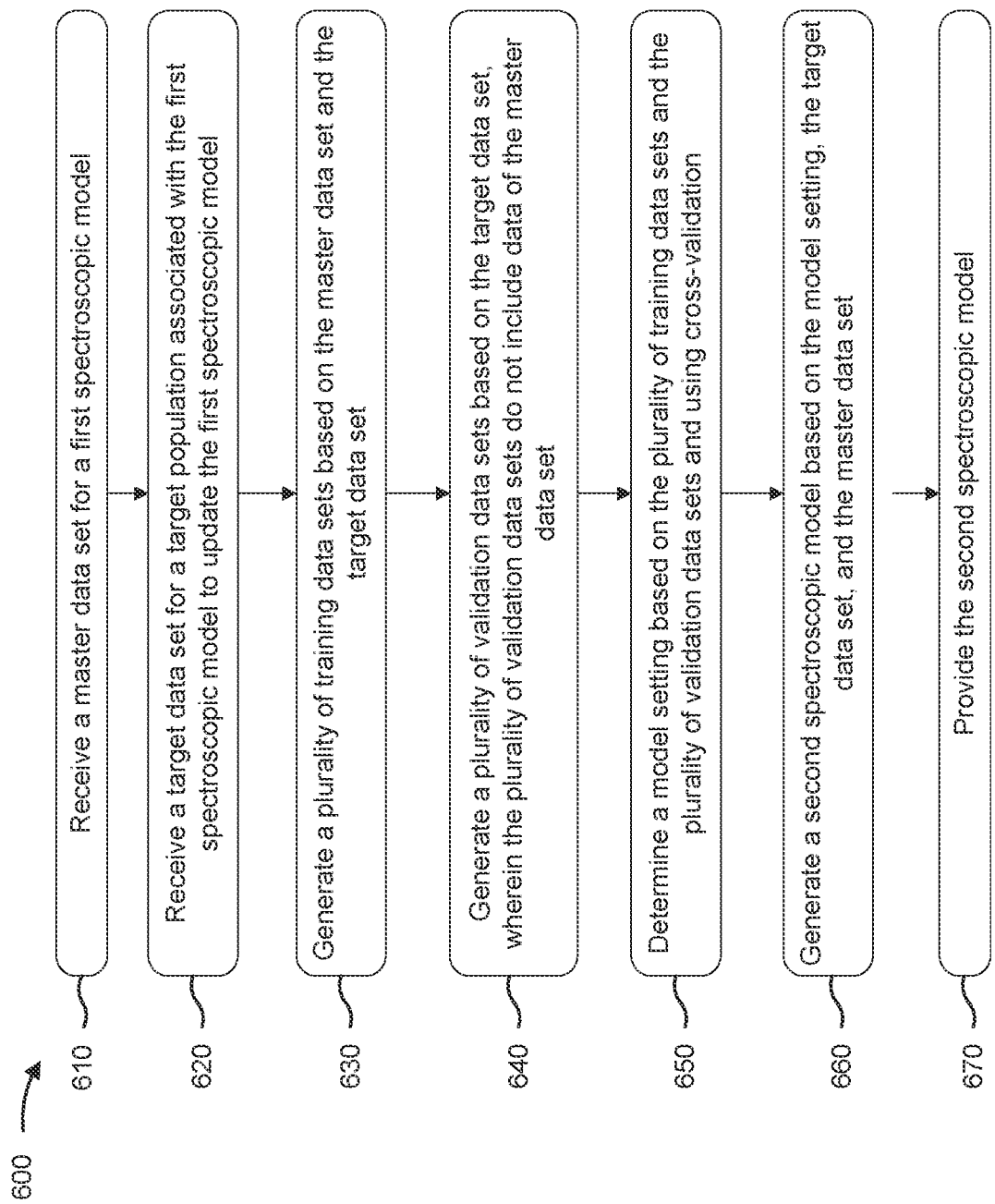

FIG. 6 is a flow chart of an example process 600 for cross-validation based calibration of a spectroscopic model. In some implementations, one or more process blocks of FIG. 6 may be performed by control device (e.g., control device 210). In some implementations, one or more process blocks of FIG. 6 may be performed by another device or a group of devices separate from or including the control device, such as a spectrometer (e.g., spectrometer 220) and/or the like.

As shown in FIG. 6, process 600 may include receiving a master data set for a first spectroscopic model, receive a target data set for a target population associated with the first spectroscopic model to update the first spectroscopic model generate a plurality of training data sets based on the master data set and the target data set, generate a plurality of validation data sets based on the target data set and wherein the plurality of validation data sets do not include data of the master data set (block 610). For example, the control device (e.g., using processor 320, memory 330, storage component 340, input component 350, output component 360, communication interface 370 and/or the like) may receive a master data set for a first spectroscopic model, receive a target data set for a target population associated with the first spectroscopic model to update the first spectroscopic model, generate a plurality of training data sets based on the master data set and the target data set, generate a plurality of validation data sets based on the target data set and wherein the plurality of validation data sets do not include data of the master data set, as described above. In some aspects, the plurality of validation data sets do not include data of the master data set.

As shown in FIG. 6, process 600 may include receiving a master data set for a first spectroscopic model (block 610). For example, the control device (e.g., using processor 320, memory 330, storage component 340, input component 350, output component 360, communication interface 370 and/or the like) may receive a master data set for a first spectroscopic model, as described above.

As shown in FIG. 6, process 600 may include receiving a target data set for a target population associated with the first spectroscopic model to update the first spectroscopic model (block 620). For example, the control device (e.g., using processor 320, memory 330, storage component 340, input component 350, output component 360, communication interface 370 and/or the like) may receive a target data set for a target population associated with the first spectroscopic model to update the first spectroscopic model, as described above.

As shown in FIG. 6, process 600 may include generating a plurality of training data sets based on the master data set and the target data set (block 630). For example, the control device (e.g., using processor 320, memory 330, storage component 340, input component 350, output component 360, communication interface 370 and/or the like) may generate a plurality of training data sets based on the master data set and the target data set, as described above.

As shown in FIG. 6, process 600 may include generating a plurality of validation data sets based on the target data set and wherein the plurality of validation data sets do not include data of the master data set (block 640). For example, the control device (e.g., using processor 320, memory 330, storage component 340, input component 350, output component 360, communication interface 370 and/or the like) may generate a plurality of validation data sets based on the target data set, as described above. In some aspects, the plurality of validation data sets do not include data of the master data set.

As further shown in FIG. 6, process 600 may include determining a model setting based on the plurality of training data sets and the plurality of validation data sets and using cross-validation (block 650). For example, the control device (e.g., using processor 320, memory 330, storage component 340, input component 350, output component 360, communication interface 370 and/or the like) may determine a model setting based on the plurality of training data sets and the plurality of validation data sets, as described above.

As further shown in FIG. 6, process 600 may include generating a second spectroscopic model based on the model setting, the target data set, and the master data set (block 660). For example, the control device (e.g., using processor 320, memory 330, storage component 340, input component 350, output component 360, communication interface 370 and/or the like) may generate a second spectroscopic model based on the model setting, the target data set, and the master data set, as described above.

As further shown in FIG. 6, process 600 may include providing the second spectroscopic model (block 670). For example, the control device (e.g., using processor 320, memory 330, storage component 340, input component 350, output component 360, communication interface 370 and/or the like) may provide the second spectroscopic model, as described above.

Process 600 may include additional implementations, such as any single implementation or any combination of implementations described below and/or in connection with one or more other processes described elsewhere herein.

In a first implementation, the model setting is at least one of a partial least squares (PLS) factor of a PLS model, a quantity of components of a principal component regression (PCR) model, a support vector regression (SVR) parameter of an SVR model, or a preprocessing setting.

In a second implementation, alone or in combination with the first implementation, process 600 includes generating a plurality of partial performance metrics for each of the plurality of training data sets and a corresponding validation data set of the plurality of validation data sets, aggregating the plurality of partial performance metrics to generate a total performance metric, and determining the model setting to minimize an error value of the total performance metric.

In a third implementation, alone or in combination with one or more of the first and second implementations, process 600 includes performing a spectroscopic determination based on the measurement and using the second spectroscopic model, and providing an output identifying the spectroscopic determination.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   causing, by a control device, a spectrometer to perform one or more first spectroscopic measurements for a target data set;
   determining, by the control device and based on a master data set and the target data set, multiple training sets for multiple folds and multiple corresponding validation sets for the multiple folds;
   generating, by the control device, a spectroscopic model based on the multiple training sets and the multiple corresponding validation sets;
   causing, by the control device and after generating the spectroscopic model, the spectrometer to perform one or more second spectroscopic measurements on an unknown sample; and
   performing, by the control device, a spectroscopic analysis of the one or more second spectroscopic measurements using the spectroscopic model.

2. The method of claim 1,
   wherein the multiple training sets include the master data set and the target data set, and
   wherein the multiple corresponding validation sets include only the target data set.

3. The method of claim 1, wherein determining the multiple training sets and the multiple corresponding validation sets comprises:
   assigning, to a training set of the multiple training sets, all data from the master data set and a portion of data from the target data set.

4. The method of claim 1, wherein determining the multiple training sets and the multiple corresponding validation sets comprises:
   assigning, to a corresponding validation set of the multiple corresponding validation sets, a corresponding portion of data from the target data set without assigning data from the master data set to corresponding validation set.

5. The method of claim 1,
   wherein the master data set comprises an initial set of spectroscopic measurements, performed by a first spectrometer, on an initial population at an initial time,
   wherein the spectrometer is a second spectrometer, and
   wherein the one or more first spectroscopic measurements are performed by the second spectrometer on a subsequent population at a subsequent time.

6. The method of claim 1, wherein generating the spectroscopic model comprises:
   determining performance metrics for the multiple folds based on the multiple training sets and the multiple corresponding validation sets; and
   generating the spectroscopic model based on the performance metrics.

7. The method of claim 6, wherein the performance metrics include a partial least squares (PLS) factor for a fold of the multiple folds.

8. The method of claim 1, wherein generating the spectroscopic model comprises:
   determining multiple performance metrics based on the multiple training sets and the multiple corresponding validation sets;
   determining an optimal partial least squares (PLS) factor based on the multiple performance metrics; and
   generating the spectroscopic model based on the optimal PLS factor.

9. The method of claim 1, wherein generating the spectroscopic model comprises:
   determining a partial least squares (PLS) factor for a fold of the multiple folds;
   determining a root mean square error (RMSE) value for the PLS factor;
   determining an optimal PLS factor based on the PLS factor and the RMSE value; and
   generating the spectroscopic model based on the optimal PLS factor.

10. A device, comprising:
    one or more memories; and
    one or more processors, coupled to the one or more memories, configured to:
    cause a spectrometer to perform one or more spectroscopic measurements for a target data set;

determine, based on a master data set and the target data set, multiple training sets for multiple folds and multiple corresponding validation sets for the multiple folds; and generate a spectroscopic model based on the multiple training sets and the multiple corresponding validation sets.

11. The device of claim 10,
wherein the multiple training sets include the master data set and the target data set, and
wherein the multiple corresponding validation sets include only the target data set.

12. The device of claim 10, wherein the one or more processors, to determine the multiple training sets and the multiple corresponding validation sets, are configured to:
assign, to a training set of the multiple training sets, all data from the master data set and a portion of data from the target data set.

13. The device of claim 10, wherein the one or more processors, to determine the multiple training sets and the multiple corresponding validation sets, are configured to:
assign, to a corresponding validation set of the multiple corresponding validation sets, a corresponding portion of data from the target data set without assigning data from the master data set to the corresponding validation set.

14. The device of claim 10, wherein the one or more processors, to generate the spectroscopic model, are configured to:
determine performance metrics for the multiple folds based on the multiple training sets and the multiple corresponding validation sets; and
generate the spectroscopic model based on the performance metrics.

15. The device of claim 10, wherein the one or more processors, to generate the spectroscopic model, are configured to:
determine multiple performance metrics based on the multiple training sets and the multiple corresponding validation sets;
determine an optimal partial least squares (PLS) factor based on the multiple performance metrics; and
generate the spectroscopic model based on the optimal PLS factor.

16. The device of claim 10, wherein the one or more processors are further configured to:
provide, based on generating the spectroscopic model, one or more of:
the spectroscopic model for storage via a data structure,
the spectroscopic model for deployment on one or more other spectrometers, or
output relating to the spectroscopic model.

17. A non-transitory computer-readable medium storing a set of instructions, the set of instructions comprising:
one or more instructions that, when executed by one or more processors of a device, cause the device to:
cause a spectrometer to perform one or more spectroscopic measurements for a target data set;
determine, based on a master data set and the target data set, multiple training sets for multiple folds and multiple corresponding validation sets for the multiple folds;
generate a spectroscopic model based on the multiple training sets and the multiple corresponding validation sets; and
provide the spectroscopic model or output relating to the spectroscopic model.

18. The non-transitory computer-readable medium of claim 17, wherein the multiple training sets include the master data set and the target data set.

19. The non-transitory computer-readable medium of claim 17, wherein the multiple corresponding validation sets include only the target data set.

20. The non-transitory computer-readable medium of claim 17,
wherein the master data set comprises an initial set of spectroscopic measurements, performed by a first spectrometer, on an initial population at an initial time,
wherein the spectrometer is a second spectrometer, and
wherein the one or more first spectroscopic measurements are performed by the second spectrometer on a subsequent population at a subsequent time.

* * * * *